Aug. 23, 1932.  J. THEYS  1,873,672
SPRINKLING SADDLE
Filed July 28, 1931  2 Sheets-Sheet 1
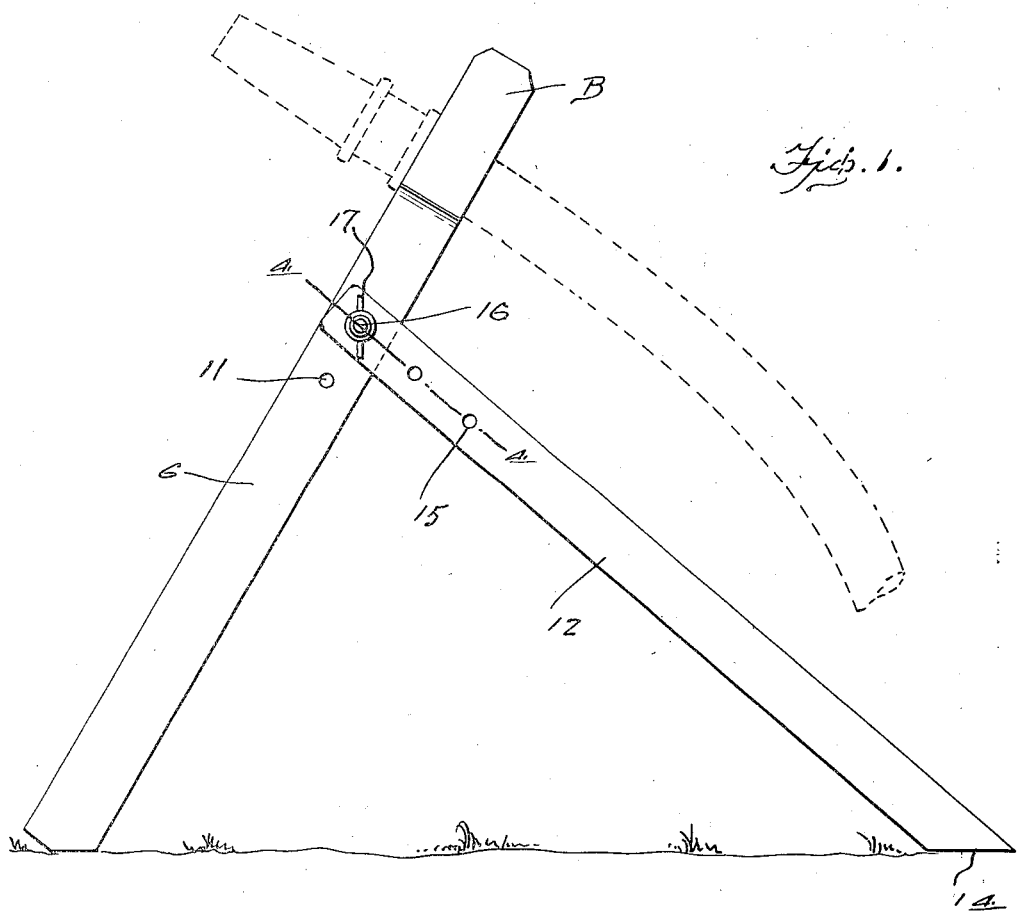
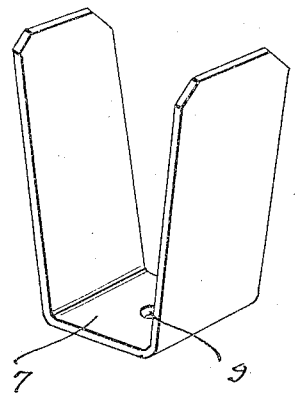
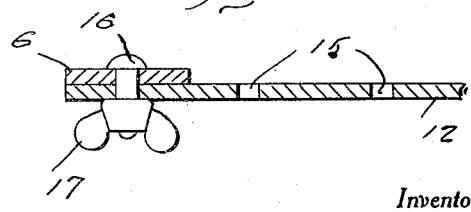
Inventor
John Theys
By Clarence A. O'Brien
Attorney Aug. 23, 1932.　　　　J. THEYS　　　　1,873,672
SPRINKLING SADDLE
Filed July 28, 1931　　　2 Sheets-Sheet 2
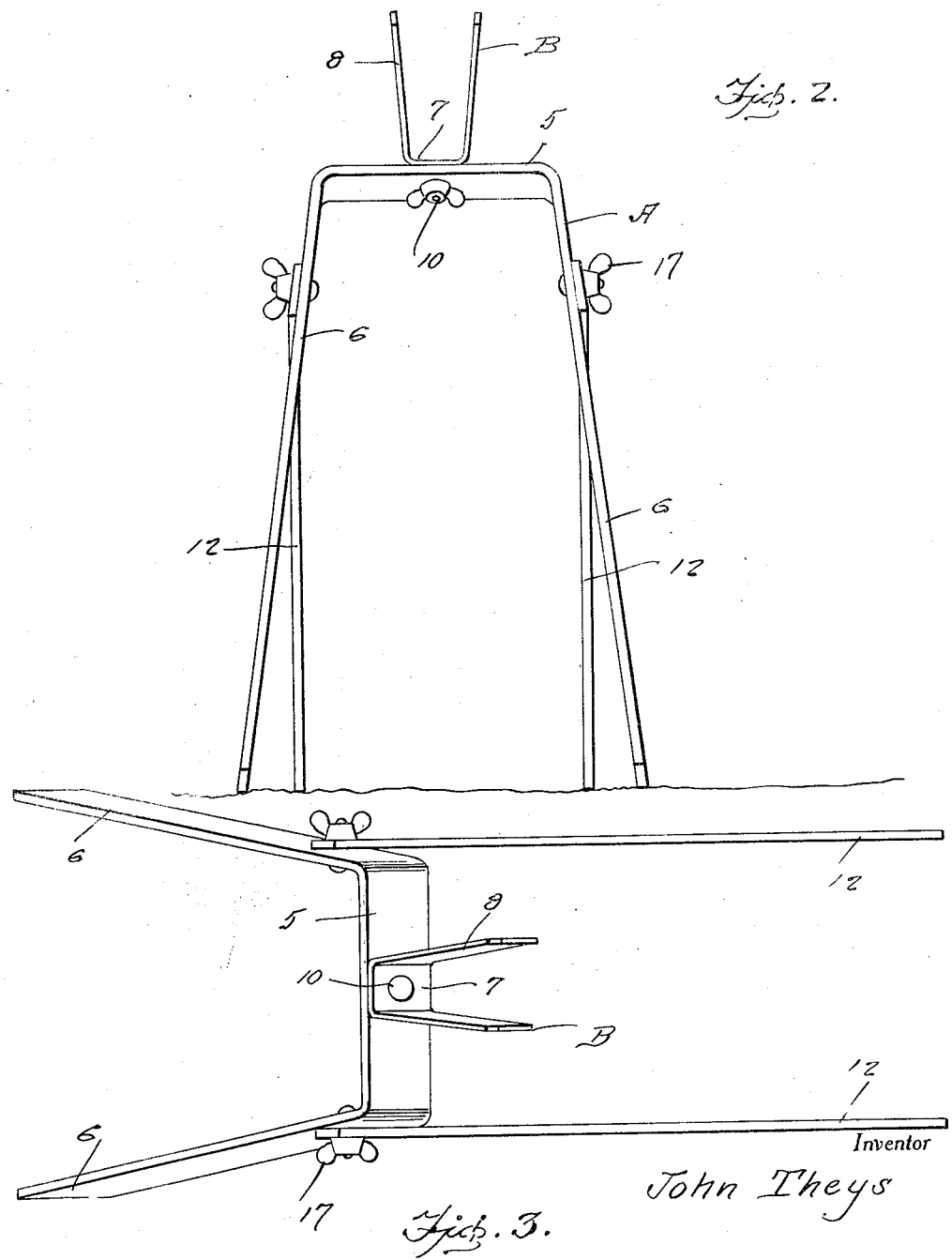
Inventor
John Theys
By Clarence A. O'Brien
Attorney Patented Aug. 23, 1932

1,873,672

UNITED STATES PATENT OFFICE

JOHN THEYS, OF DENVER, COLORADO

SPRINKLING SADDLE

Application filed July 28, 1931. Serial No. 553,680.

The present invention relates to a saddle to hold the nozzle of a hose when used for sprinkling lawns and the like and the prime object of the invention resides in the provision of a device of this nature which is exceedingly simple in its construction, readily and easily adjusted, light and durable, easy to handle and manipulate, thoroughly efficient and reliable in use and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawings:

Figure 1 is a side elevation of the device embodying the features of my invention.

Figure 2 is a front elevation thereof.

Figure 3 is a top plan view thereof.

Figure 4 is a detail section taken substantially on the line 4—4 of Figure 1, and Figure 5 is a perspective view of the saddle per se.

Referring to the drawings in detail it will be seen that the letter A denotes a stand of a somewhat inverted U-shaped formation formed with a straight upper cross portion 5 having depending legs 6 depending from the ends thereof, formed integrally therewith and diverging outwardly and downwardly from each other. Letter B denotes a substantially U-shaped saddle having a straight cross portion 7 with sides 8 rising therefrom and diverging upwardly and outwardly from each other. The cross portion 7 is formed with an opening 9 so that a bolt and nut 10 may be used for securing the saddle to the central part of the cross portion 5 to rise therefrom thereby permitting the saddle to be placed at different angles. This saddle may be formed of spring metal and will readily hold the hose nozzle as is indicated in dotted lines in Figure 1. The legs 7 are formed with one or more openings 11. Elongated props 12 have one end beveled as at 14 and adjacent the other ends are formed with longitudinal series of openings 15. Bolts 16 extend through registering openings 11 and 15 which have been selected depending upon the angle it is desired to place the stand A with respect to the ground and of course thumb nuts or the like 17 are threaded on these bolts 8 which may be tightened after the desired adjustment has been made.

It is thought that the construction, utility and advantages of this invention will now be quite apparent to those skilled in this art without a more detailed description thereof.

The present embodiment of the invention has been described for the purpose of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

A device for supporting the nozzle end of a sprinkling hose comprising a substantially inverted U-shaped stand having a straight like depending portion, the stand being formed of one piece of material, a hose holding member of inverted U-shape and formed from a single piece of material with the bight bolted to the bight of the stand and its legs diverging upwardly from the bight, the upper portion of the legs of the stand having a longitudinally extending row of holes therein, a prop forming bar for attachment to each leg of the stand, each bar having a longitudinally extending row of holes in its upper part with its lower end beveled to engage a surface and a bolt passing through registering holes in each prop and a leg of the stand.

In testimony whereof I affix my signature.

JOHN THEYS.